March 28, 1961 R. G. SINNER 2,977,512

MODULAR CIRCUIT CONSTRUCTION

Filed Sept. 8, 1958 2 Sheets-Sheet 1

INVENTOR.
RAYMOND G. SINNER
BY
F. D. Prager
ATTORNEY

March 28, 1961 R. G. SINNER 2,977,512

MODULAR CIRCUIT CONSTRUCTION

Filed Sept. 8, 1958

2 Sheets-Sheet 2

INVENTOR.
RAYMOND G. SINNER
BY
F. D. Prager
ATTORNEY

United States Patent Office 2,977,512
Patented Mar. 28, 1961

2,977,512

MODULAR CIRCUIT CONSTRUCTION

Raymond G. Sinner, Ashland, N.J., assignor to Philco Corporation, Philadelphia, Pa., a corporation of Pennsylvania Filed Sept. 8, 1958, Ser. No. 759,725

3 Claims. (Cl. 317—101)

Figures 1, 2:
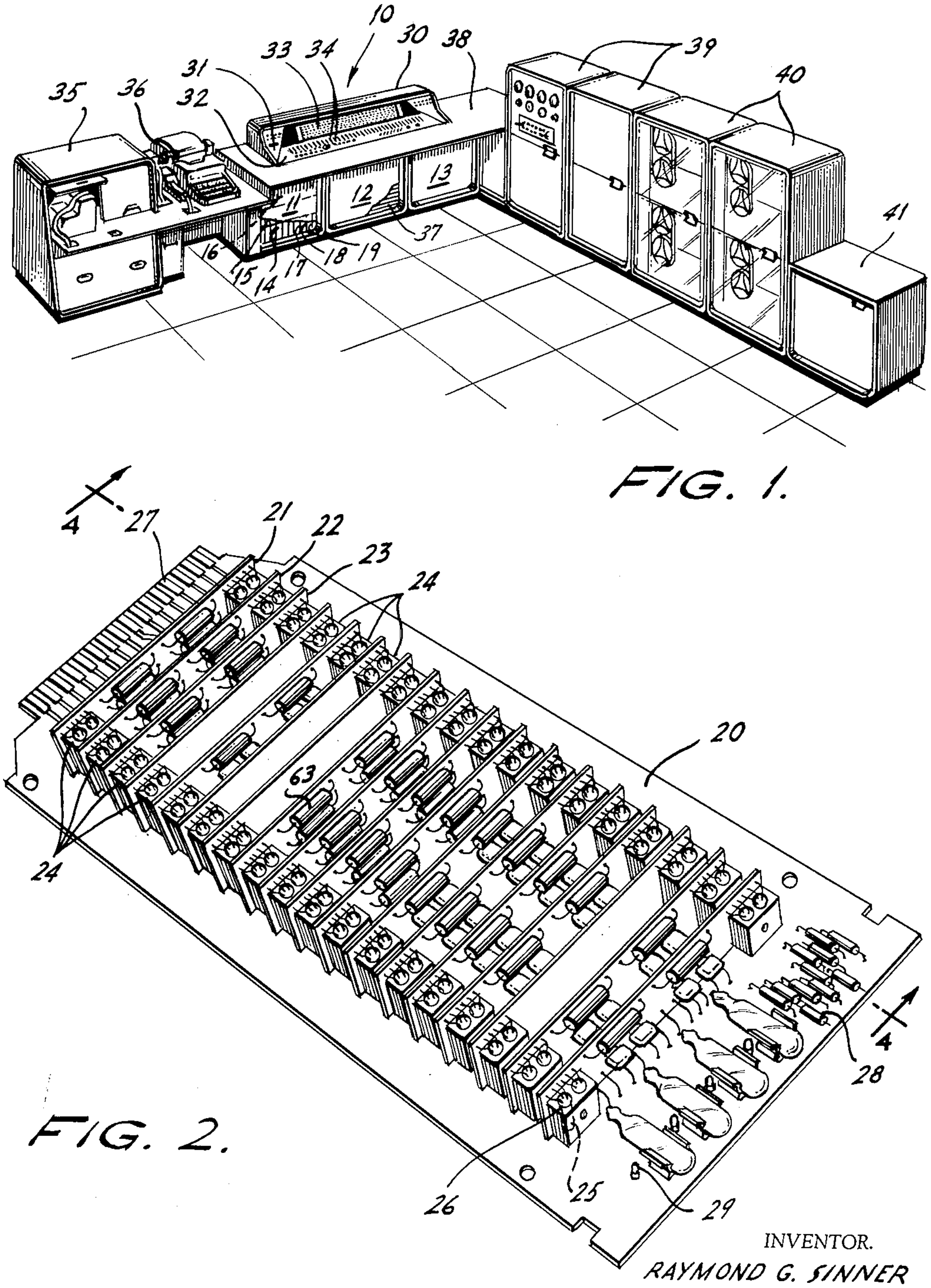

This invention relates to components of electronic computers, data processing systems and the like.

Such components must be exceedingly reliable, because of the enormous complexity of the interlocked operations, typically of microsecond duration, if not shorter, which are consecutively and/or simultaneously performed in the use of a computer or the like. Particularly some of the more delicate elements, such as transistors, must therefore be tested repeatedly and rigorously, both by themselves and in association with such other elements as are added at successive stages of fabrication. A typical modern, high-speed computer system contains literally millions of circuit elements and components, including tens of thousands of transistors or the like, and the more delicate components require the performance of corresponding numbers of electrical tests in the fabrication of the unit. The invention, in one phase thereof, has reference to mechanical means for facilitating such electrical testing.

The said transistors, which will hereinafter be discussed as being representative of a class of highly delicate and complex, active circuit components, are associated with many other and usually simpler circuit elements, mostly of the passive type. These later elements, when once tested by themselves, are less likely than are the transistors to require renewed and more comprehensive tests. Therefore, and in order to facilitate rapidity of ultimate comprehensive assembly, it is desirable that such other parts be assembled or subassembled in relatively durable and compact ways. It is, however, necessary in apparatus according to the invention that many of the transistors be mounted on the same panels or subpanels or the like which also contain some of the simpler devices, and at the same time to arrange said transistors in easily accessible and/or removable ways.

It is therefore among the primary objects of the invention not only to provide a high degree of compactness and permanence of the structures carrying the circuitry, but also to provide means which facilitate testing and possible replacement of transistors and the like, in the fabrication of computers and the like.

It has been found possible to achieve both objects by means including a novel structural element, which effects relatively rigid and compact assembly of main panels and subpanels, with circuits thereon, while also effecting an assembly of other components, including mainly transistors associated with the circuitry, which latter assembly is desirably accessible for convenient testing and replacement. This novel, unitary structure has the further advantage of providing required, solid mechanical protection for the delicate transistors, as well as full compliance with so-called "logical" requirements, while fully assuring said relatively free and ready access to the transistors during required tests, and providing a space-saving and necessarily densely packed arrangement of all parts. Thus the new structure contributes materially toward making the entire system compact, serviceable and economical. All this is achieved by the use of relatively simple blocks or the like, as will be shown hereinafter.

In the field of computer circuitry and the like, miniaturization of elements and assemblies has been important, and it is therefore a further object of the invention so to mount and arrange the various panels, subpanels, transistors, and associated parts as to facilitate construction and use of a miniaturized and subminiaturized system. This has been achieved with the aid of the mounting means or blocks already mentioned. A system employing these new elements may combine enormous numbers of transistors, and even greater numbers of other components, in a space of unprecedented compactness. For instance, in certain typical applications hereof, a highly versatile, as well as rapid, data processing system is housed in a cabinet no larger than an office desk, whereas heretofore it was generally necessary to encase equipment of equivalent capacity—even when operated at slower speeds—in cabinets filling thousands of cubic feet of office space.

The indicated objects, together with others which may be noted upon a study of the disclosure which follows, have been achieved with the aid of a characteristic structural combination, wherein a flat main panel has narrow, parallel subpanels secured thereto by small mounting blocks, constituting combined transistor sockets and subpanel brackets, and wherein the transistors are inserted in said sockets in directions parallel with the subpanels and normal to the main panel. Desirably, each socket and bracket member has a form somewhat similar to that of a miniature engine block, apertured for incorporation of transistor means and exteriorly adapted for the panel and subpanel mounting functions referred to. By the use of such blocks as mounting means, a very advantageous arrangement of all components and subpanels, on the main panel, has been provided.

Figure 3:
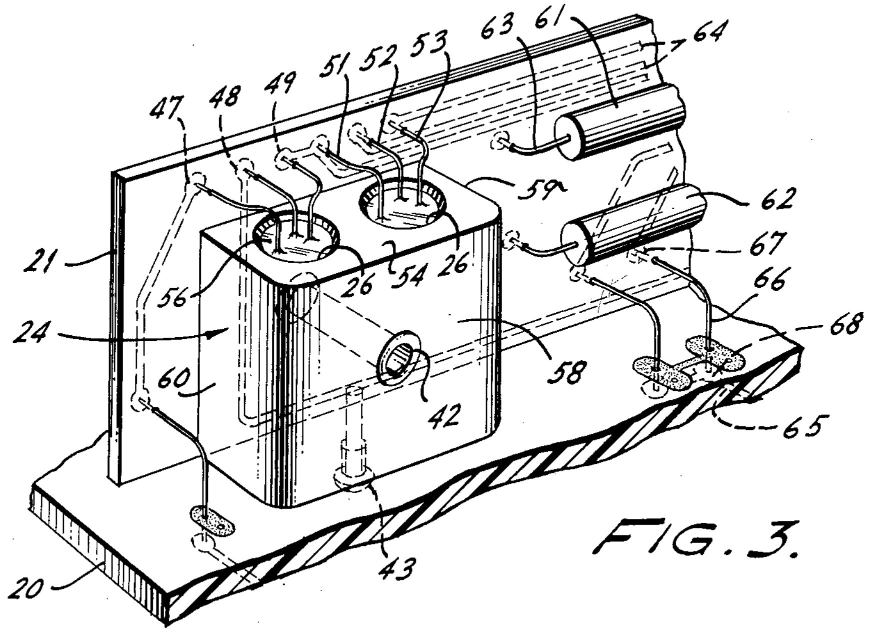
Figure 5:
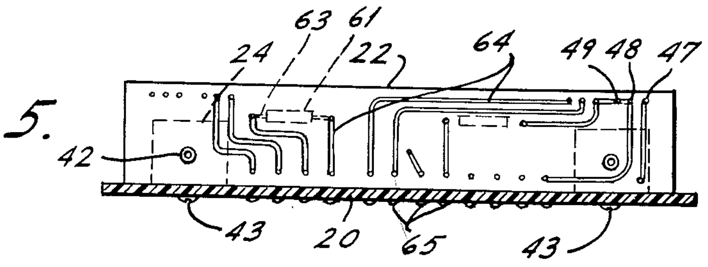
Figure 4:
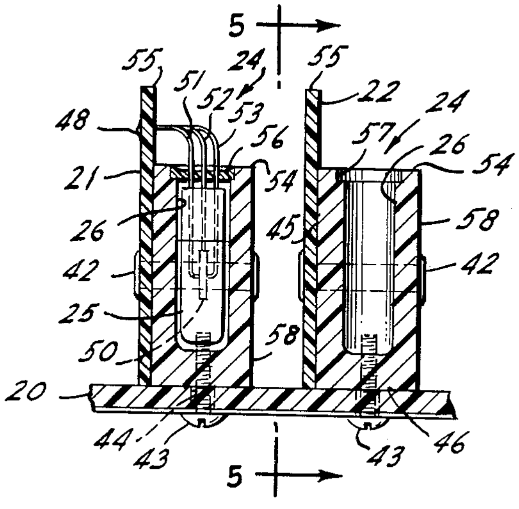

This arrangement will now be described, with reference to the drawing, wherein Figure 1 is a perspective overall view of a computer system, parts of which incorporate the present invention; Figure 2 is a perspective view, on a much larger scale, of a so-called "register," forming part of said system and incorporating the present invention; Figure 3 is a perspective view, on a still larger scale, of a detail from such a "register," including one of the aforementioned block members; Figure 4 is a fragmentary section taken along line 4—4 in Figure 2; and Figure 5 is a view taken along line 5—5 in Figure 4.

Referring first to Figure 1, the computer system as illustrated comprises a desk-shaped frame and control unit 10, a lower part of which is formed by a set of "modules" or cabinets 11, 12, 13, each of said cabinets in turn including a plurality of horizontal "rows" 14, 15, 16 of the major circuit panels 17, 18, 19, vertically mounted, said main or major panels also being referred to as "registers." In a typical case the lower portion of control unit 10, resembling the cabinet portion of a desk, comprises three modules, each module comprising four rows and each row having fifty registers. A typical register, in turn, has eighty to one hundred transistors thereon, together with their respective circuit branches and passive elements.

For the purpose of mounting such transistors and associated circuit branches, such a panel or register, identified in Figure 2 by numeral 20, has secured thereto a series of subpanels 21, 22, 23, etc., at close distances from one another and at right angles to a surface of the main panel. In accordance with the invention, the firm securement of each subpanel to the main panel 20 is provided by two transistor socket blocks 24 which serve also as securement brackets, one such block being secured to each end of each subpanel. Transistors 25, forming the principal components of the entire circuitry, are held by and within blocks 24 in easily accessible and temporarily removable fashion, for which purpose each block 24 has a pair of cylindrical socket bores 26 parallel to the subpanel and normal to the register; one such bore being provided for each cylindrical transistor unit 25. Such unit is disposed in the socket with the lead wires of the unit extending outwardly from the socket.

Multiple contact or plug means 27 are provided at one end of each main panel 20, for removably plugging such panel into suitable circuitry, not shown, which latter circuitry is provided in a back portion of cabinet 11 or 12, etc. Register panel 20 is also equipped with circuit means 28, including diodes 29, independently of subpanels 21, 22, etc. In this latter respect, substantially different arrangements are usually employed on different main panels or registers.

It is unecessary to discuss in great detail the circuitry and related features of the complete computer or data processing system, employing the mounting blocks of the present invention, but it may be well to mention briefly that control unit 10 of the particular embodiment hereof comprises, above module cabinets 11, 12, etc., a control panel 30 having an indicator surface 31 and a control surface 32, together with additional registers, not shown, which are installed behind said surfaces, in arrangements generally similar to that indicated at 17, 18, etc. A considerable variety of operations can be performed by manually operating switches 33, 34, etc. on control surface 32.

In addition, great numbers of automatic "interrogation" and/or "reply" functions are made available by a digital reading and writing unit 35, using paper tape and/or punched cards, combined with a keyboard and typing or linotyping system 36, and connected to control unit 10. Either manual switches 33, 34 or systems of electronic switches provided by registers 17, etc. cooperate with "address" and "memory" devices and the like in order to process instructions and information, such memory portions including mainly a high-speed system 37 of magnetic core matrices or "planes" and a relatively low-speed magnetic drum unit 38. Power supply cabinets 39 are provided for the operation of the registers and other parts of the system thus far described. Still further, the illustrated system includes a number of cabinets 40 for long-term or permanent "storage" of data on magnetic tapes, desirably with automatic access searching equipment module means 41. Parts of the cabinets 39 to 41 and of units 38 and 35, as well as major parts of unit 10, are filled with modules of registers similar to those shown at 17, 18 and 19.

In more particular accordance with the invention, and as best shown in Figures 3 and 4, each panel and transistor connecting block 24 is secured to the corresponding subpanel, such as 21 by a single rivet 42, extending through a central portion of the block between transistor holding chambers 26. On the other hand each block 24, and thereby the subpanel secured thereto, is fastened to main panel 20 by a screw 43 extending through a suitable hole 44 in panel 20 and threaded into a lower portion of block 24, it being generally sufficient and desirable to secure each subpanel to the main panel by two of these screws.

A block 24 can be described as having front and bottom surfaces 45, 46, advantageously at right angles to one another and with the understanding that designations such as "front" and "bottom" are utilized in this connection in order to describe the element in such position as it occupies during most of the fabricating and testing operations initially mentioned, wherein delicate electronic tests must be applied by sending test currents not only through terminals in plug-in section 27 (Figure 2) but particularly also through the terminals 47, 48, 49 provided for the semiconductive unit 50 of each transistor 25 (Figures 3 to 5), at the ends of transistor lead wires 51, 52 and 53.

Removal and reinstallation of transistors is facilitated by the feature that resistor chambers or socket cavities 26 open upwardly, in the aforementioned fabricating orientation of the panel, so that ready access can be gained to each transistor 25, which can be upwardly withdrawn from its socket 26 without any necessity for interference with the securement of blocks 24, the subpanels and their auxiliary circuit units. Furthermore, testing of transistors, without removal thereof, is facilitated by the feature that each block 24, as best shown in Figure 4, has a top surface 54 horizontally disposed at least a short distance below the top edge 55 of the next adjacent subpanel. By virtue of this feature, and by arranging terminals 47, 48, 49 of transistor lead wires above top surface 54 of the next following block, such terminals can readily be reached for test, regardless of the tightly packed arrangement of the entire register card, as is clear from Figure 2. Inspection and testing operations are further facilitated by fitting a plastic cap 56 into a suitable recess 57 in each top surface 54 (Figure 4), such caps being desirably color-coded in order to identify the particular types of semiconductor unit 50 contained in the transistor housings 25, held in the various sockets 26.

Thus it will be seen that the use of the new panel unit 20 (Figure 2) which may for instance have eighty to one hundred transistors thereon—sometimes including many different types of transistors—greatly facilitates identification of and subsequent work on such transistors as have to be tested as to some or all of their parameters, at any one time incident to the fabrication program, in order that ultimately the many thousands or ten thousands of minute wafers 50, together with their associated circuitry, will form a fully reliable control unit for the computer or data processing system. It will now be understood that each bracket and socket member 24 advantageously has a flat back surface 58 (Figure 4), adjacent the flat front of the nearest subpanel, and that the side surfaces 59, 60 of said block desirably are similarly flat (Figure 3), providing a substantially box-shaped member or block which occupies only a minimum of space on the subpanel secured thereto, thereby leaving substantial space available for other, auxiliary or passive circuit elements 61, 62.

As best indicated in Figure 5, conventional lead wires 63 (Figure 3) are used to secure these other components to the subpanels and particularly to printed or similar circuitry 64 on the front surfaces of the subpanels (Figure 5), said circuitry being connected with added printed circuitry 65, provided on main panel 20, by additional lead wires 66 (Figure 3), to combine transistors 25 with components 61, 62, etc. into suitable "gates" or the like, either to provide required "access" or control functions for the operation of storage units etc. or for providing "flip-flops" and related circuitry for other purposes. Although large numbers of lead wires 66 are typically provided, they are in no way relied upon to mechanically hold the subpanel on the panel. On the contrary, they are desirably formed and installed to extend from subpanel to panel in form of thin resilient arches, as best shown in Figure 3, in order to make sure that their terminals 67, soldered to printed circuits of the subpanels, as well as their similar terminals 68 on the main panel, remain safe and unstressed even in case of unavoidable thermal warping of the panels.

No attempt will be made herein to describe the highly intricate fabrication of transistor wafers 50 or the comprehensive job of constructing modules 11, 12, 13 and associated equipment. It is, however, pertinent to describe briefly the fabrication of a register such as that of Figure 2. This starts by well known procedures of "printing" or similarly forming the various types of subpanel strips 21, 22, 23, etc., as required, and of manually or automatically inserting thereon and soldering thereto, lead wires 63 of auxiliary elements 61, 62, together with panel connector wires 66 and lead wires 51, 52, 53 of transistors 25. Desirably, the transistors as well as other components have been tested prior to insertion and soldering and an additional test may now be performed on a completed subpanel in order to determine whether the subpanel with the components inserted thereon reliably performs the functions assigned thereto. It is however more convenient to postpone many, if not all, of these further tests until subpanels 21, etc. have been installed on main panel 20, whereupon the testing can be facilitated by utilization of socket means 27.

Therefore, blocks 24 are now assembled with the subpanels by slipping each block over the corresponding transistors (except in those cases where a subpanel, exceptionally, provides no transistors at the mounting location of a block, as indicated in the right hand portion of Figure 4, in which case the block is used only as a panel mounting member). The blocks and subpanels are then secured to one another by rivets 42, forming a permanent and substantially rigid unit of each block and the adjacent subpanel areas. This unit is then assembled with register panel 20 by bolts 43, and panel connector wires 66 are inserted in corresponding mounting holes in the main panel. When all subpanels of a register have thus been assembled, the underside of the register is exposed to conventional solder treatment or the like for completing the interconnecting circuits of the panel and subpanels. Thereafter the aforementioned functional tests can readily be applied, many of them being adequately performed by temporarily plugging the register into a suitable test fixture, not shown, and manually or automatically conducting applications of various test currents to socket means 27.

In such functional testing, improper results if any must be traced either to improper solder spots on subpanel or panel circuits or to improper components. As previously mentioned, the service requirements of the transistors are such that particularly rigorous testing may have to be applied to the same and such can readily be done by applying manual test probes to lead wire terminals 47, 48, 49, whereupon it may sometimes be found that a transistor which seemed acceptable, when tested by itself, is no longer acceptable when operating in the vicinity of such electrical capacity, and the like, as may be present in the surroundings thereof. In such cases accordingly it may become necessary to exchange transistors, which is relatively simple as it becomes necessary only to remove three easily accessible solder spots 47, 48, 49 and to withdraw transistor 25 upwardly from socket 26. A replacement transistor 25 can readily be lowered into said socket and the flexible lead wires thereof connected with the subpanel by manual soldering.

In other cases difficulties may be traced to components such as auxiliary element 61 or 62, which may be so closely packed in the panel-subpanels assembly as to be inaccessible. In such, relatively rare cases, accordingly, it may be necessary to unsolder a row of panel connector wires 66, loosen a pair of bolts 43 and remove the corresponding subpanel, for repair and/or replacement.

Pursuant to these exacting tests and the completion of the fabrication of the register, it can generally be assumed that the register will safely perform the electronic switching and other operations assigned thereto, throughout the life of the computer system. No attempt will of course be made to describe such switching operations with any particularity, as they belong to the "logical functions" rather than to the structural features of the computer. It may however be well at least briefly to draw attention to the fact that the preferred mounting block structure 24, with a pair of transistor socket chambers 26 therein, has been found to be suitable not only from the standpoints of efficient construction, fabrication and testing but also from that of convenient and flexible logical design. In this connection it will be appreciated by persons skilled in the art that major portions of all "registers" serve to provide "flip-flops" or circuits which are equivalent thereto in that each of them is likely to comprise a pair or two pairs of transsistors, along with passive components. Thus each subpanel can be laid out and used as a basically self-contained circuit sub-assembly, thereby additionally facilitating the entire fabrication and testing program.

Although only one embodiment of the invention has been described, it should be understood that the details thereof are not to be construed as limitative of the invention, except insofar as is consistent with the scope of the following claims.

I claim:

1. In a computer "register" having a series of electronic component systems of the "flip-flop" type on a main panel surface, each system including a pair of transistors, the opposite panel surface providing circuitry of the "printed" type for interconnection of said systems, the improvement which comprises: a system of small block means, each comprising at least one block which has one of said pairs of transistors encased therein, next to one another, the block being only slightly larger than the pair of transistors and having the leads of both transistors extending from one surface of the block to form part of one of said systems, the several blocks being uniformly, closely spaced to form a row of blocks parallel to a side of said main panel surface; block fastener means for each block, removably securing the block to said main panel surface; a row of narrow auxiliary panels, each approximately as long as the main panel surface is wide and each approximately as wide as said blocks extend from the main panel surface, said auxiliary panels being arranged with their surfaces facing one another, each extending from one to the other side of the main panel surface, and each having one of said component systems thereon; panel fastener means for each auxiliary panel, securing the panel to one of said block means so as to secure the panel edgewise to the main panel surface; and connectors for each component system, connecting such system with the circuitry on the opposite panel surface in a connection area adjacent and parallel to the auxiliary panel.

2. In a computer "register" as described in claim 1 the added feature that each auxiliary panel has a pair of said blocks secured thereto, one such block being secured to each end of the auxiliary panel.

3. In a computer "register" as described in claim 1 the added feature that the connectors of each system are a series of flexible arcuate wires, each disposed in a plane normal to each of said several panels, each wire having an end connected to the corresponding component system, a wire portion extending from such end toward the opposite auxiliary panel and also toward the main panel surface, and an opposite end extending through the main panel surface for connection to the circuitry on the opposite panel surface.

References Cited in the file of this patent

UNITED STATES PATENTS

| | | |
|---|---|---|
| 2,474,988 | Sargrove | July 5, 1949 |
| 2,641,635 | Scal | June 9, 1949 |
| 2,762,987 | Mackey | Sept. 11, 1956 |
| 2,910,628 | Keener | Oct. 27, 1959 |

FOREIGN PATENTS

| | | |
|---|---|---|
| 762,973 | Great Britain | Dec. 5, 1956 |